United States Patent
Tsutsumi et al.

(10) Patent No.: US 10,935,959 B2
(45) Date of Patent: *Mar. 2, 2021

(54) MOTOR CONTROL DEVICE, CONTROL SYSTEM, AND MOTOR CONTROL METHOD

(71) Applicant: FANUC CORPORATION, Yamanashi (JP)

(72) Inventors: Tomohisa Tsutsumi, Yamanashi-ken (JP); Yuuki Morita, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 49 days.

This patent is subject to a terminal disclaimer.

(21) Appl. No.: 16/180,274

(22) Filed: Nov. 5, 2018

(65) Prior Publication Data

US 2019/0137976 A1 May 9, 2019

(30) Foreign Application Priority Data

Nov. 7, 2017 (JP) .............................. JP2017-214606

(51) Int. Cl.
*G05B 19/414* (2006.01)
*G05B 19/4103* (2006.01)

(52) U.S. Cl.
CPC ....... *G05B 19/414* (2013.01); *G05B 19/4103* (2013.01); *G05B 2219/33166* (2013.01)

(58) Field of Classification Search
CPC .............. G05B 19/414; G05B 19/4103; G05B 2219/33166
See application file for complete search history.

(56) References Cited

U.S. PATENT DOCUMENTS

2006/0093127 A1* 5/2006 Zehentner ............ G05B 19/414
379/359
2016/0297043 A1  10/2016 Inaguchi

FOREIGN PATENT DOCUMENTS

| CN | 101000500 A | 7/2007 |
|----|-------------|--------|
| CN | 101201611 A | 6/2008 |
| CN | 101276219 A | 10/2008 |
| CN | 102545730 A | 7/2012 |
| CN | 103947101 A | 7/2014 |
| CN | 104508580 A | 4/2015 |

(Continued)

OTHER PUBLICATIONS

English Abstract and Machine Translation for Japanese Publication No. 2010-170435 A, published Aug. 5, 2010, 12 pgs.

(Continued)

*Primary Examiner* — Mohammad Ali
*Assistant Examiner* — Sheela Rao
(74) *Attorney, Agent, or Firm* — Fredrikson & Byron, P.A.

(57) ABSTRACT

A motor control device is equipped with a command receiving unit adapted to receive a movement command and a first control period of the movement command from a numerical controller, a command generating unit which, on the basis of the first control period and a second control period which is determined in advance, is adapted to generate a movement command of the second control period from the movement command of the first control period, and a motor control unit adapted to control a motor, in accordance with the movement command generated by the command generating unit.

6 Claims, 5 Drawing Sheets

(56) References Cited

FOREIGN PATENT DOCUMENTS

| | | | |
|---|---|---|---|
| CN | 105388849 A | 3/2016 | |
| CN | 107134967 A | 9/2017 | |
| JP | H03125035 A | 5/1991 | |
| JP | H10301630 A | 11/1998 | |
| JP | 200376408 A | 3/2003 | |
| JP | 200648203 A | 2/2006 | |
| JP | 2006259823 A | 9/2006 | |
| JP | 2007213113 A | 8/2007 | |
| JP | 2010170435 A | 8/2010 | |
| JP | 2013062928 A | 4/2013 | |
| JP | 2016200523 A | 12/2016 | |

OTHER PUBLICATIONS

English Abstract and Machine Translation for Japanese Publication No. 2006-048203 A, published Feb. 16, 2006, 8 pgs.
English Abstract and Machine Translation for Japanese Publication No. 2003-076408 A, published Mar. 14, 2003, 7 pgs.
English Abstract for Japanese Publication No. 2016-200523 A, published Dec. 1, 2016, 2 pgs.
English Abstract and Machine Translation for Japanese Publication No. 2007-213113 A, published Aug. 23, 2007, 5 pgs.
Untranslated Decision to Grant a Patent mailed by Japan Patent Office (JPO) for Application No. 2017/214606, Nov. 5, 2019, 3 pgs.
English Machine Translation of Decision to Grant a Patent mailed by Japan Patent Office (JPO) for Application No. 2017-214606, Nov. 5, 2019, 2 pgs.
Untranslated Notice of Reasons for Refusal mailed by Japan Patent Office (JPO) for Application No. 2017-214606, Aug. 20, 2019, 4 pgs.
English Machine Translation of Notice of Reasons for Refusal dated by Japan Patent Office (JPO) for Application No. 2017-214606, Aug. 20, 2019, 5 pgs.
English Abstract and Machine Translation for Japanese Publication No. JP2006-259823A, published Sep. 28, 2006, 9 pgs.
English Abstract and Machine Translation for Chinese Publication No. CN101201611A, published Jun. 18, 2008, 11 pgs.
English Abstract and Machine Translation for Japanese Publication No. JP2013-062928A, published Apr. 4, 2013, 8 pgs.
English Abstract and Machine Translation for Chinese Publication No. CN103947101A, published Jul. 23, 2014, 15 pgs.
English Abstract and Machine Translation for Chinese Publication No. CN104508580A, published Apr. 8, 2015, 11 pgs.
English Abstract and Machine Translation for Japanese Publication No. JPH03-125035A, published May 28, 19991, 12 pgs.
English Abstract and Machine Translation for Japanese Publication No. JPH10-301630A, published Nov. 13, 1998, 5 pgs.
English Abstract and Machine Translation for Chinese Publication No. CN101000500A, published Jul. 18, 2007, 8 pgs.
English Abstract and Machine Translation for Chinese Publication No. CN101276219A, published Oct. 1, 2008, 10 pgs.
English Abstract and Machine Translation for Chinese Publication No. CN102545730A, published Jul. 4, 2012, 7 pgs.
English Abstract and Machine Translation for Chinese Publication No. CN105388849A, published Mar. 9, 2016, 9 pgs.
English Abstract and Machine Translation for Chinese Publication No. CN107134967A, published Sep. 5, 2017, 30 pgs.

* cited by examiner

MOTOR CONTROL DEVICE, CONTROL SYSTEM, AND MOTOR CONTROL METHOD

CROSS-REFERENCE TO RELATED APPLICATION

This application is based upon and claims the benefit of priority from Japanese Patent Application No. 2017-214606 filed on Nov. 7, 2017, the contents of which are incorporated herein by reference.

BACKGROUND OF THE INVENTION

Field of the Invention

The present invention relates to a motor control device, a control system, and a motor control method, which serve to control a motor.

Description of the Related Art

As described in Japanese Laid-Open Patent Publication No. 2016-200523, a motor control device controls a motor on the basis of commands from a numerical controller.

SUMMARY OF THE INVENTION

However, when a control period of the numerical controller differs from the control period of the motor control device, a problem occurs in that an excess or a deficiency occurs in the number of data required for the control, and the control of the motor is delayed. As a result, fluctuations in speed and positional deviations occur, and the stability of the motor control deteriorates.

Thus, an object of the present invention is to provide a motor control device, a control system, and a motor control method, which act to prevent a decrease in stability of the motor control, even in the case that the control period of a numerical controller differs from the control period of the motor control device.

According to a first aspect of the present invention, a motor control device is provided, comprising a command receiving unit adapted to receive a movement command and a first control period of the movement command from a numerical controller, a command generating unit which, on the basis of the first control period and a second control period which is determined in advance, is adapted to generate a movement command of the second control period from the movement command of the first control period, and a motor control unit adapted to control a motor, in accordance with the movement command generated by the command generating unit.

According to a second aspect of the present invention, a control system is provided, comprising the motor control device and the numerical controller of the aforementioned first aspect of the present invention, wherein the numerical controller includes a period setting unit adapted to set the first control period.

According to a third aspect of the present invention, a motor control method for controlling a motor is provided, comprising a command receiving step of a motor control device receiving a movement command and a first control period of the movement command from a numerical controller, a command generating step of the motor control device generating, on the basis of the first control period and a second control period which is determined in advance, a movement command of the second control period from the movement command of the first control period, and a motor controlling step of the motor control device controlling the motor, in accordance with the movement command generated by the command generating step.

According to the present invention, it is possible to prevent a decrease in stability of the motor control, even in the case that the control period of the numerical controller differs from the control period of the motor control device.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a motor control device, a control system, and a motor control method according to the present invention will be presented and described in detail below with reference to the accompanying drawings.

Embodiments

Figure 1:
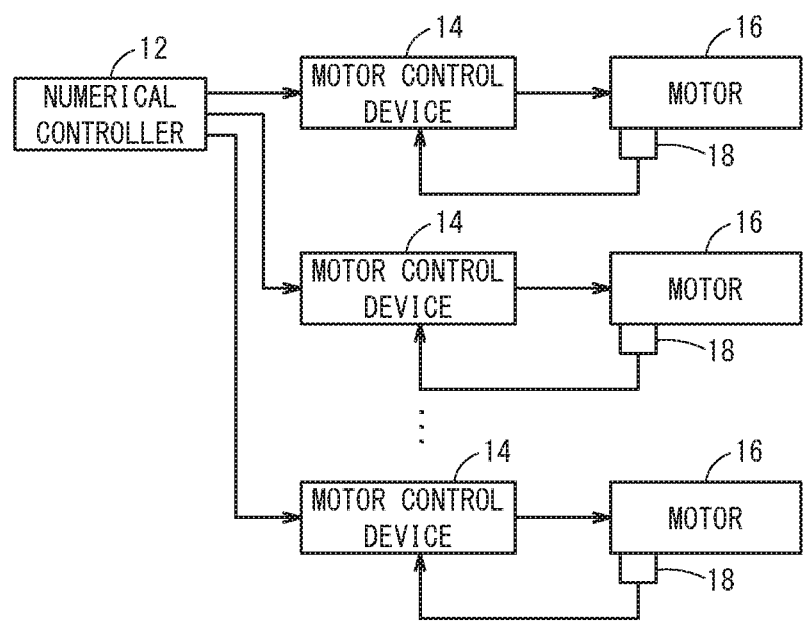
FIG. 1 is a diagram showing the configuration of a control system according to the present embodiment.

FIG. 1 is a diagram showing the configuration of a control system 10 according to the present embodiment. The control system 10 comprises a numerical controller 12, a plurality of motor control devices 14, and a plurality of motors 16. A control period T1 of the numerical controller 12 and respective control periods T2 of each of the plurality of motor control devices 14 differ from each other.

The numerical controller 12 is a higher order control device for controlling the motors 16 in accordance with a program or an operator's operations for driving the motors 16. The numerical controller 12 outputs (transmits) to the plurality of motor control devices 14 commands (hereinafter referred to as movement commands) S for driving the motors 16. Consequently, the numerical controller 12 is made capable of controlling the plurality of motors 16. The numerical controller 12 may control the plurality of motors 16 using different movement commands (drive commands) S for each of the motors 16.

The plurality of motor control devices 14 control the plurality of motors (for example, servo motors) 16 in accordance with the movement commands S transmitted thereto. Each of the plurality of motor control devices 14 controls a corresponding motor 16. The motor control devices 14 control driving (rotation) of the motors 16 by supplying current to the motors 16 in accordance with the movement commands S.

Sensors 18 such as rotation sensors (for example, encoders) for detecting the rotational position or the rotational speed thereof, and current sensors for detecting the currents supplied to the motors 16 are provided on the motors 16. The motor control devices 14 feedback-control the motors 16 on the basis of detection signals detected by the sensors 18.

Figure 2:
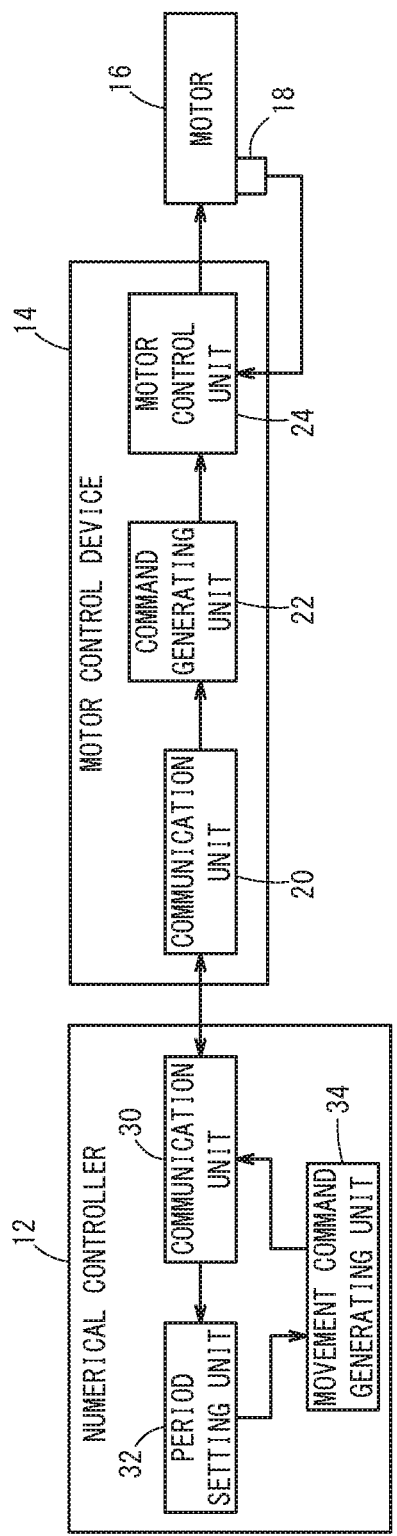
FIG. 2 is a functional block diagram showing a specific configuration of a numerical controller and a motor control device.

FIG. 2 is a functional block diagram showing a specific configuration of the numerical controller 12 and one of the motor control devices 14. Since each of the plurality of motor control devices 14 has the same configuration, in FIG. 2, only one of the motor control devices 14 will be described as an example. The numerical controller 12 and each of the motor control devices 14 are equipped with processors such as a CPU or the like, and memories, etc. First, after describing the configuration of the motor control device 14, a description will be given concerning the configuration of the numerical controller 12.

The motor control device 14 includes a communication unit 20, a command generating unit 22, and a motor control unit 24. The communication unit 20 serves to send and receive signals to and from the numerical controller 12. The communication unit (command receiving unit) 20 receives the movement command S and a control period (first control period) T1 of the movement command S from the numerical controller 12. The numerical controller 12 transmits (outputs) the movement command S to the motor control device 14 at the control period T1. The communication unit 20 outputs the received movement command S and the control period T1 to the command generating unit 22. Further, the communication unit (period transmission unit) 20 transmits a control period T2 of the motor control device 14 to the numerical controller 12.

On the basis of the control period T1 and the control period (second control period) T2 of the motor control device 14, which is determined in advance, the command generating unit 22 generates the movement command S of the control period T2 from the movement command S of the control period T1. The command generating unit 22 generates a movement command S of the control period T2 from the movement command S of the control period T1, using a ratio between the control period T1 and the control period T2. Stated otherwise, on the basis of the control periods T1 and T2, the command generating unit (command conversion unit) 22 converts the movement command S of the control period T1 into the movement command S of the control period T2. In order to distinguish between the movement command S transmitted from the numerical controller 12 and the movement command S generated by the command generating unit 22, the case in which the movement command S is generated by the command generating unit 22 will be represented by S'.

The command generating unit 22 generates the movement command S' in a manner so that the motor control device 14, the control period T2 of which is provisionally equivalent to the control period T1, places the motor 16 substantially in the same state of the motor 16 at a time that the motor 16 is controlled by the movement command S. The control period T2 is set to be shorter than the control period T1 (T1>T2). According to the present embodiment, the ratio between the control period T1 and the control period T2 is described as having a relationship of T1:T2=4:3.

Figure 3:
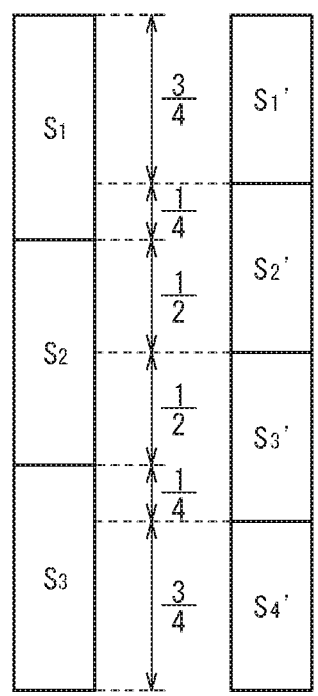
FIG. 3 is a diagram for explaining generation of a movement command by a command generating unit shown in FIG. 2.

FIG. 3 is a diagram for explaining generation of the movement command S' by the command generating unit 22. A plurality of the movement commands S received by the communication unit 20 are represented by $S_1$, $S_2$, and $S_3$, and a plurality of the generated movement commands S' are represented by $S_1'$, $S_2'$, $S_3'$, and $S_4'$. Suppose the numerical controller 12 transmits the movement commands S in a manner so that the motor 16 is controlled in order of the commands $S_1$, $S_2$, and $S_3$, and the communication unit 20 receives the movement commands S in order of the commands $S_1$, $S_2$, and $S_3$. Moreover, since the ratio between the control period T1 of the movement commands S and the control period T2 of the movement commands S' is 4:3, the periods of $S_1$ to $S_3$ and the periods of $S_1'$ to $S_4'$ become the same.

The command generating unit 22 generates as the movement command $S_1'$ a command corresponding to ¾ of the movement command $S_1$. For example, in the case that the command $S_1$ is a command to rotate by 8 degrees, the generated movement command $S_1'$ becomes a command to rotate by 6 degrees (=8 degrees×¾).

In addition, the command generating unit 22 generates, as the movement command $S_2'$, a command including a command corresponding to the remaining one-fourth of the movement command $S_1$, and a command corresponding to one-half of the movement command $S_2$. For example, in the case that the movement command $S_2$ is a command to rotate by 4 degrees, the generated movement command $S_2'$ becomes a command including a command to rotate by 2 degrees (=8 degrees×¼) (a command corresponding to one-fourth of the movement command $S_1$), and a command to rotate by 2 degrees (=4 degrees×½) (a command corresponding to one-half of the movement command $S_1$).

In this manner, the command generating unit 22 generates the movement command S' from the movement command S, on the basis of the ratio between the control period T1 and the control period T2. The command generating unit 22 outputs the generated movement command S' to the motor control unit 24.

The motor control unit 24 controls the motor 16 in accordance with the movement command S'. At this time, the motor control unit 24 feedback-controls the motor 16 on the basis of detection signals detected by the sensor 18. Consequently, even if the control periods T1, T2 differ between the numerical controller 12 and the motor control device 14, it is possible to prevent an excess or deficiency from occurring in the number of data required for the control, and to prevent the control from being delayed. Therefore, it is possible to prevent fluctuations in speed and positional deviations from occurring, as well as to prevent the stability of the control of the motor 16 from deteriorating. Accordingly, even in the case that the control periods T1, T2 differ mutually between the numerical controller 12 and the motor control device 14, the motor 16 can be controlled in a manner so that the state of the motor 16 is substantially the same as when the motor control device 14 controls the motor 16 with the movement command S in accordance with the control period T1.

Next, a description will be made concerning the configuration of the numerical controller 12. The numerical controller 12 includes a communication unit 30, a period setting unit 32, and a movement command generating unit 34. The communication unit 30 serves to send and receive signals to and from the communication unit 20 of the motor control device 14. The motor control device 14 transmits the control period T2 to the numerical controller 12 via the communication unit 20, and the communication unit (period receiving unit) 30 receives the control period T2 from the motor control device 14. The communication unit 30 outputs the received control period T2 to the period setting unit 32. Further, the communication unit (command transmitting unit) 30 transmits the movement command S and the control period T1 that was set to the motor control device 14.

The period setting unit 32 sets the control period T1. The period setting unit 32 sets as the control period T1 a period that is longer than the control period T2 of the motor control device 14. Consequently, the control period T2 of the motor control device 14 becomes a period which is shorter than the control period T1 of the numerical controller 12, and therefore, an excess or deficiency in the number of data required for the control can be prevented from occurring, and it is possible to prevent the control from being delayed. Accordingly, the stability of the control of the motor 16 can be prevented from further deteriorating.

Further, the period setting unit 32 sets the control period T1 in accordance with the processing load ratio by the numerical controller 12 (a load ratio of the CPU of the numerical controller 12). For example, as the control period T1 becomes shorter, the load ratio of the CPU becomes higher, and therefore, the control period T1 is set to be longer in the case that the currently set load ratio is high, and the control period T1 is set to be shorter in the case that the currently set load ratio is low. In accordance with this feature, the stability of the control of the motor 16 can be prevented from further deteriorating. The load ratio of the CPU signifies a current effective amount of processing with respect to the processing capacity of the CPU. The period setting unit 32 outputs the control period T1 that was set to the communication unit 30 and the movement command generating unit 34. The set control period T1 is transmitted from the communication unit 30 to the motor control device 14.

By analyzing a program for driving the motor 16, the movement command generating unit 34 sequentially generates movement commands S at the set control period T1. The movement command generating unit 34 outputs the generated movement commands S to the communication unit 30. The sequentially generated movement commands S are transmitted at the control period T1 from the communication unit 30 to the motor control device 14.

In FIG. 2, in order to facilitate description, an explanation was given using the numerical controller 12 and one motor control device 14, however, there may be a case in which a plurality of the motor control devices 14 are provided, as shown in FIG. 1. In this case, the communication unit 30 receives control periods T2 from each of the plurality of motor control devices 14, and the period setting unit 32 sets as the first control periods T1 a period that is longer than the longest control period T2 from among the control periods T2 of the plurality of motor control devices 14. In accordance with this feature, even if there are a plurality of the motor control devices 14, it is possible to prevent the stability of the control of the motor 16 from deteriorating.

Figure 4:
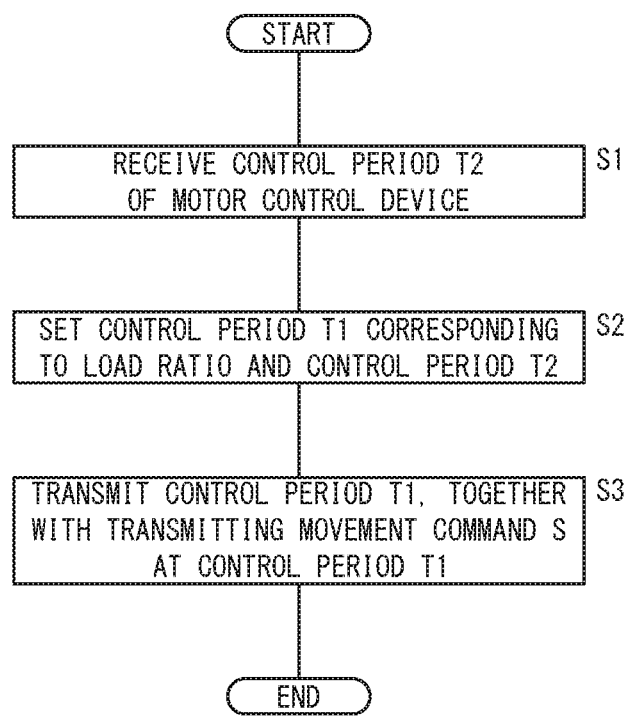
FIG. 4 is a flowchart showing operations of the numerical controller shown in FIG. 2.

Next, operations of the numerical controller 12 will be described with reference to the flowchart shown in FIG. 4. In step S1, the communication unit 30 receives the control period T2 of the motor control device 14. At this time, in the event that a plurality of the motor control devices 14 are connected to the numerical controller 12, the communication unit 30 receives control periods T2 from each of the plurality of motor control devices 14.

Next, in step S2, the period setting unit 32 sets the control period T1 corresponding to the control period T2 acquired in step S1, and the processing load ratio by the numerical controller 12. More specifically, the period setting unit 32 sets as the control period T1 a period that is longer than the control period T2 (a control period T2 that is the longest from among the plurality of control periods T2, in the case there are a plurality of the motor control devices 14), and a period which corresponds to the load ratio. It should be noted that the period setting unit 32 may set the control period T1 using either one of the control period T2 and the load ratio.

Next, in step S3, the communication unit 30 transmits the control period T1 that was set in step S2 to the motor control device 14, together with transmitting the movement commands S at the control period T1. The movement commands S are generated sequentially by the movement command generating unit 34, at the control period T1 that was set in step S2.

Figure 5:
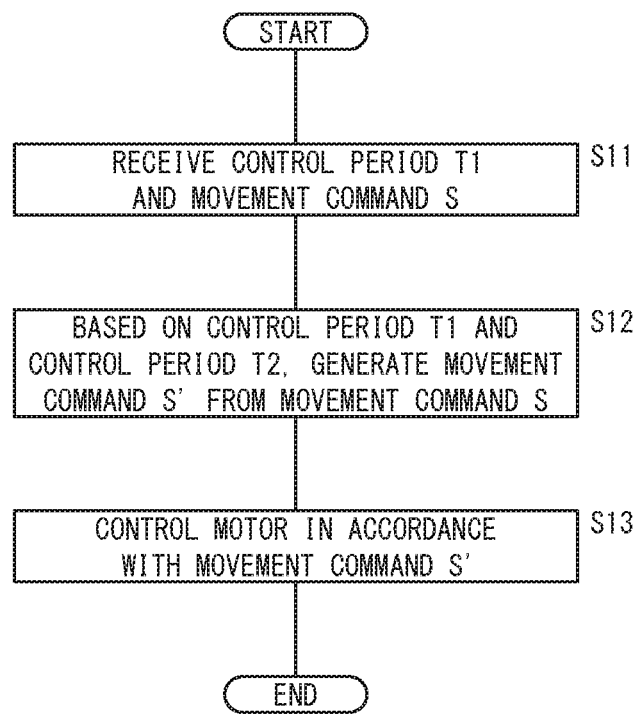
FIG. 5 is a flowchart showing operations of the motor control device shown in FIG. 2.

Next, operations of the motor control device 14 will be described with reference to the flowchart shown in FIG. 5. In step S11, the communication unit 20 receives the control period T1 and the movement command S transmitted from the numerical controller 12.

Next, in step S12, the command generating unit 22 generates the movement command S' of the control period T2 from the movement command S of the control period T1, on the basis of the control period T1 and the control period T2.

Next, in step S13, the motor control unit 24 controls the motor 16 in accordance with the movement command S'.

Technical Concepts Obtained from the Embodiments

Technical concepts which can be grasped from the above embodiments will be described below.

<First Technical Concept>

The motor control device (14) is equipped with the command receiving unit (20) which receives the movement command (S) and the first control period (T1) of the movement command (S) from the numerical controller (12), the command generating unit (22) which, on the basis of the first control period (T1) and the second control period (T2) which is determined in advance, is adapted to generate the movement command (S') of the second control period (T2) from the movement command (S) of the first control period (T1), and the motor control unit (24) adapted to control the motor (16), in accordance with the movement command (S') generated by the command generating unit (22).

In accordance with these features, even if the control periods (T1, T2) differ between the numerical controller (12) and the motor control device (14), it is possible to prevent an excess or deficiency from occurring in the number of data required for the control, and to prevent the control from being delayed. Therefore, it is possible to prevent fluctuations in speed and positional deviations from occurring, as well as to prevent the stability of the control of the motor (16) from deteriorating.

The second control period (T2) may be a period that is shorter than the first control period (T1). In accordance with this feature, the stability of the control of the motor (16) can further be prevented from deteriorating.

<Second Technical Concept>

The control system (10) comprises the motor control device (14) of the aforementioned first technical concept, and the numerical controller (12). The numerical controller (12) is equipped with the period setting unit (32) which sets the first control period (T1).

In accordance with these features, even if the control periods (T1, T2) differ between the numerical controller (12) and the motor control device (14), it is possible to prevent an excess or deficiency from occurring in the number of data required for the control, and to prevent the control from being delayed. Therefore, it is possible to prevent fluctuations in speed and positional deviations from occurring, as well as to prevent the stability of the control of the motor (16) from deteriorating. Further, an appropriate period can be set as the first control period (T1).

The period setting unit (32) may set the first control period in accordance with a processing load ratio by the numerical controller (12). In accordance with this feature, the stability of the control of the motor (16) can be prevented from deteriorating.

The numerical controller (12) may also comprise the period receiving unit (30) which receives the second control period (T2) from the motor control device (14). The period setting unit (32) may set as the first control period (T1) a period that is longer than the second control period (T2). In accordance with this feature, the stability of the control of the motor (16) can further be prevented from deteriorating.

The control system (10) may comprise a plurality of the motor control devices (14). The period receiving unit (30) may receive the second control period (T2) from each of the plurality of motor control devices (14). The period setting unit (32) may set as the first control period (T1) a period that is longer than the longest of the second control periods (T2) from among the second control periods (T2) of the plurality of motor control devices (14). In accordance with this feature, even if there are a plurality of the motor control devices (14), it is possible to prevent the stability of the control of the motor (16) from deteriorating.

<Third Technical Concept>

The motor control method for controlling the motor (16) comprises a command receiving step of the motor control device (14) receiving the movement command (S) and the first control period (T1) of the movement command (S) from the numerical controller (12), a command generating step of the motor control device (14) generating, on the basis of the first control period (T1) and the second control period (T2) which is determined in advance, the movement command (S') of the second control period (T2) from the movement command (S) of the first control period (T1), and a motor controlling step of the motor control device (14) controlling the motor (16), in accordance with the movement command (S') generated by the command generating step.

In accordance with these features, even if the control periods (T1, T2) differ between the numerical controller (12) and the motor control device (14), it is possible to prevent an excess or deficiency from occurring in the number of data required for the control, and to prevent the control from being delayed. Therefore, it is possible to prevent fluctuations in speed and positional deviations from occurring, as well as to prevent the stability of the control of the motor (16) from deteriorating.

The second control period (T2) may be a period that is shorter than the first control period (T1). In accordance with this feature, the stability of the control of the motor (16) can further be prevented from deteriorating.

The numerical controller (12) may include a period setting step of setting the first control period (T1). In accordance with this feature, an appropriate period can be set as the first control period (T1).

In the period setting step, the first control period (T1) may be set in accordance with a processing load ratio by the numerical controller (12). In accordance with this feature, the stability of the control of the motor (16) can be prevented from deteriorating.

The numerical controller (12) may also include the period receiving step of receiving the second control period (T2) from the motor control device (14). In the period setting step, there may be set as the first control period (T1) a period that is longer than the second control period (T2). In accordance with this feature, the stability of the control of the motor (16) can further be prevented from deteriorating.

In the period setting step, the second control period (T2) may be received from each of a plurality of motor control devices (14). In the period setting step, there may be set as the first control period (T1) a period that is longer than the longest of the second control periods (T2) from among the second control periods (T2) of the plurality of motor control devices (14). In accordance with this feature, even if there are a plurality of the motor control devices (14), it is possible to prevent the stability of the control of the motor (16) from deteriorating.

The present invention is not limited to the above-described embodiment, and various modifications can be made without departing from the gist of the present invention.

What is claimed is:

1. A control system comprising a motor control device and a numerical controller,
    the motor control device comprising:
      a command receiving unit adapted to receive a movement command and a first control period of the movement command from a numerical controller;
      a command generating unit which, on the basis of the first control period and a second control period which is determined in advance, is adapted to generate a movement command of the second control period from the movement command of the first control period; and
      a motor control unit adapted to control a motor, in accordance with the movement command generated by the command generating unit,
    wherein
    the numerical controller includes
      a period setting unit adapted to set the first control period; and
      a period receiving unit adapted to receive the second control period from the motor control device,
    the period setting unit sets as the first control period a period that is longer than the second control period.

2. The control system according to claim 1, wherein the period setting unit sets the first control period in accordance with a processing load ratio by the numerical controller.

3. The control system according to claim 1, comprising:
    a plurality of the motor control devices;
    wherein the period receiving unit receives the second control period from each of the plurality of motor control devices; and
    the period setting unit sets as the first control period a period that is longer than the longest of the second control periods from among the second control periods of the plurality of motor control devices.

4. A motor control method for controlling a motor, comprising:
    a command receiving step of a motor control device receiving a movement command and a first control period of the movement command from a numerical controller;
    a command generating step of the motor control device generating, on the basis of the first control period and a second control period which is determined in advance, a movement command of the second control period from the movement command of the first control period;
    a motor controlling step of the motor control device controlling the motor, in accordance with the movement command generated by the command generating step;

a period setting step of setting, by the numerical controller, the first control period;

a period receiving step of receiving, by the numerical controller, the second control period from the motor control device, wherein in the period setting step, there is set as the first control period a period that is longer than the second control period.

5. The motor control method according to claim 4, wherein, in the period setting step, the first control period is set in accordance with a processing load ratio by the numerical controller.

6. The motor control method according to claim 4, wherein:

in the period receiving step, the second control period is received from each of a plurality of motor control devices; and in the period setting step, there is set as the first control period a period that is longer than the longest of the second control periods from among the second control periods of the plurality of motor control devices.

\* \* \* \* \*